INVENTORS
HARMON W. BROWN
RAYMOND A. ERICKSON
ATTORNEY

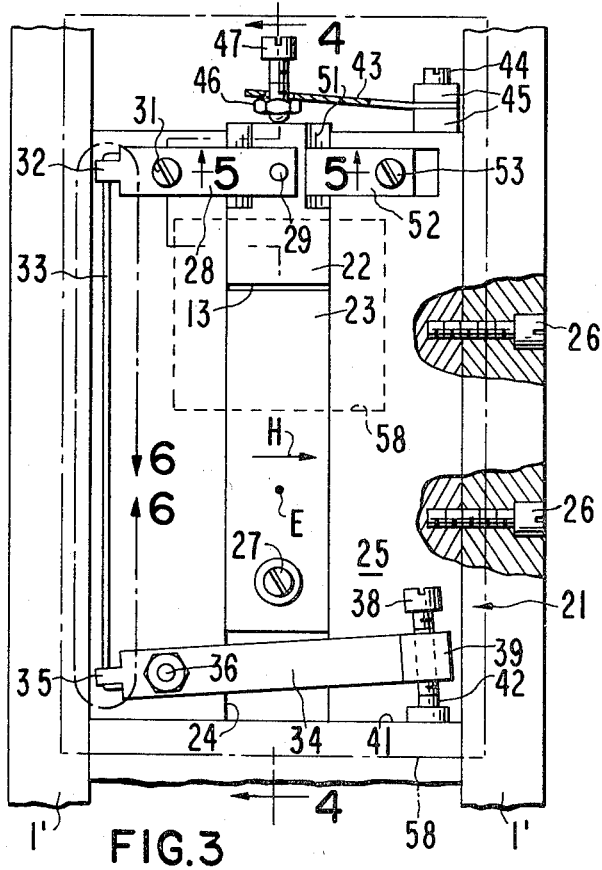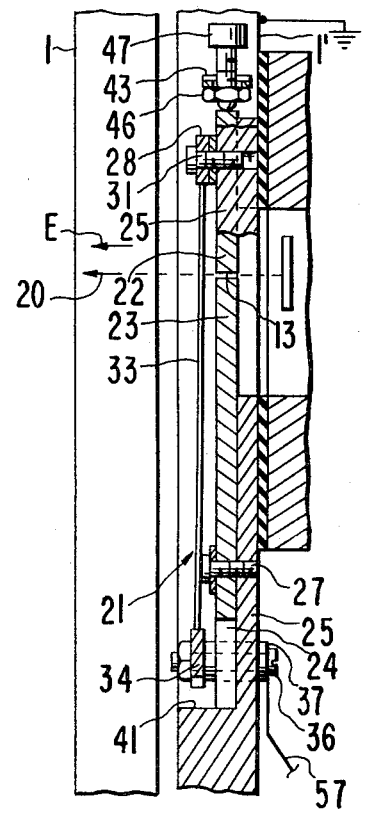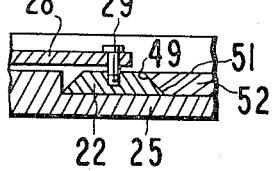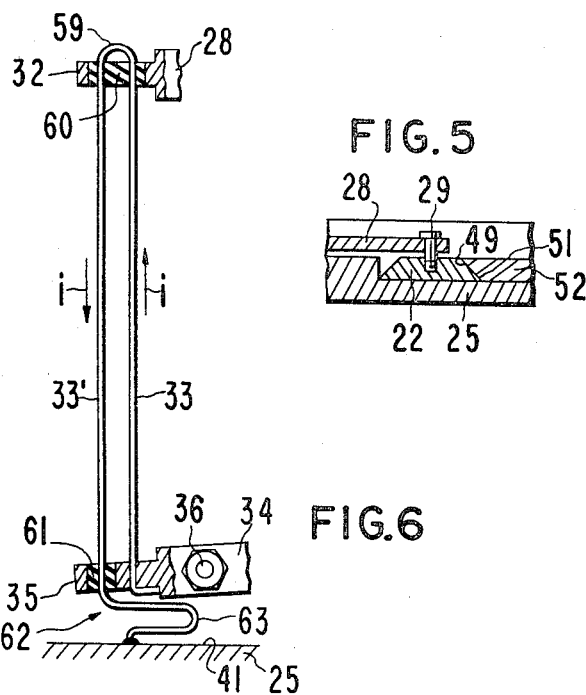
INVENTORS
HARMON W. BROWN
RAYMOND A. ERICKSON
BY
ATTORNEY

United States Patent Office 3,433,945
Patented Mar. 18, 1969

3,433,945
ELECTRICALLY ADJUSTABLE SLITS AND MASS SPECTROMETERS USING SAME
Raymond A. Erickson, San Jose, and Harmon W. Brown, Sunnyvale, Calif., assignors to Varian Associates, Palo Alto, Calif., a corporation of California
Filed Apr. 4, 1966, Ser. No. 539,917
U.S. Cl. 250—41.9    2 Claims
Int. Cl. H01j 39/34

ABSTRACT OF THE DISCLOSURE

An electrically adjustable beam defining slit and mass spectrometer using same are disclosed. The mass spectrometer includes an array of closely spaced, axially aligned, elongated, and relatively thin ring electrodes insulatively supported relative to each other and adapted to be energized with a series of independent electrical potentials to establish a uniform electric field within the region of space bounded by the array of electrodes. The uniform electric field is directed at right angles to a uniform magnetic field to be applied within the region of uniform electric field for analyzing a beam of ions according to their charge-to-mass ratio. An ion source is provided for forming and projecting the beam of ions into the region of uniform cross electric and magnetic fields. An electrically adjustable beam thickness defining slit is disposed in alignment with the beam path at the exit of the ion source. The beam defining slit includes a pair or plate-shaped members having mutually opposed, spaced apart, side edges which define the slit. A thermally expandable wire is mechanically coupled to one of the beam defining plates and an elongated cantilever spring member is mechanically coupled to one of the beam defining plates to bias the wire in tension. The wire is arranged so that its thermal expansion and contraction causes at least one of the beam defining members to move toward or away from the other plate to change the thickness of the beam. The wire, cantilever spring, and the beam defining plates are all arranged to lie within the plane of one of the ring electrodes to be disposed substantially entirely within the thickness of the ring, so as not to perturb the uniformity of the electric field produced by the ring electrodes.

Figures 1, 2:
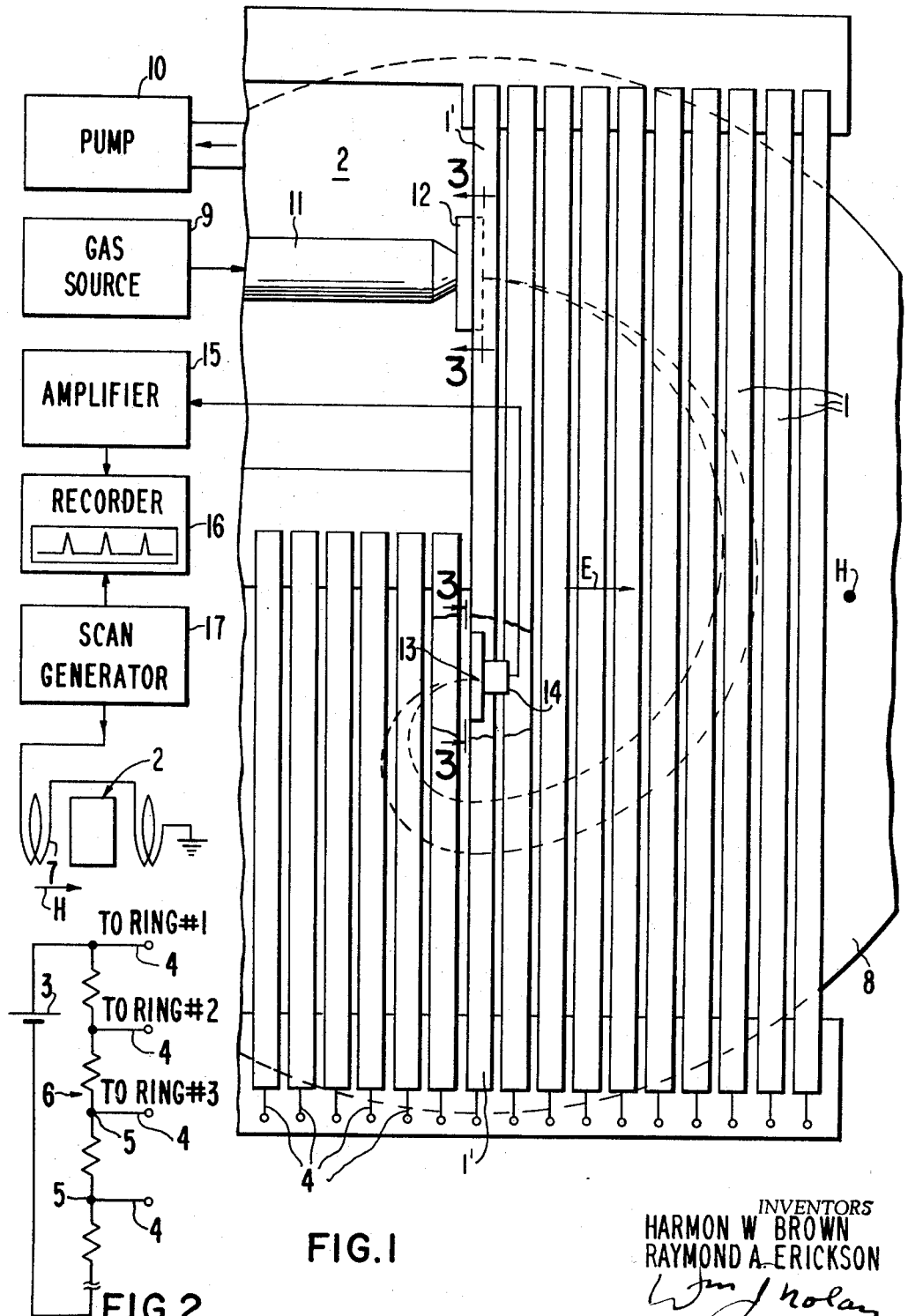

Heretofore, electrically adjustable slits have been employed in mass spectrometers. One such prior electrically adjustable slit employed a bimetallic plate defining one side edge of the slit. The bimetallic plate was elongated and fixed in position at its end remote from the slit. Intermediate its length, the bimetallic plate was formed in a hairpin shape extending a substantial distance above the plane of the slit to provide adequate bimetallic type thermal expansion for opening and closing the slit in response to a heating current passed through a heater adjacent the bimetallic plate. While such an electrically adjustable slit is useful in many mass spectrometers it is unsuited for use in a cycloidal mass spectrometer. This is because the hairpin shaped elongated portion of the bimetallic plate extends a sufficient distance above the plane of the slit, i.e., in a direction normal to the ion beam, to seriously perturb the uniformity of the electric field in the vicinity of the ion beam thereby adversely affecting mass resolution.

In the present invention an electrically adjustable slit is provided wherein the slit width actuating mechanism is relatively thin, i.e., on the order of 0.125″, in the direction normal to the plane of the slit. Such a thin actuating mechanism is especially useful in a cycloidal mass spectrometer as it produces a minimum of electric field perturbation in the immediate vicinity of the ion beam.

In a preferred embodiment of the present invention a thermally expansive slit actuating member is elongated in a plane close to and parallel to the plane of the slit. In this manner the slit actuating mechanism may be accommodated within half the thickness of one of the electric field rings of the ion analyzer of a cycloidal mass spectrometer.

The principal object of the present invention is the provision of an improved electrically adjustable ion beam defining slit and cycloidal mass spectrometer using same.

One feature of the present invention is the provision of an actuating mechanism for adjusting the width of an ion beam defining slit wherein the mechanism includes an elongated thermally expansive member elongated in a plane parallel to and closely spaced to the plane of the slit whereby the slit actuating mechanism may be accommodated within a region of space thin in a direction parallel to the direction of the ion beam passing through the slit.

Another feature of the present invention is the same as the preceding feature wherein the thermally expansive element is spring biased by a spring member preferably elongated in a direction transverse to the direction of the beam as it emerges from the slit.

Another feature of the present invention is the same as any one or more of the preceding features wherein the thermally expansive element is heated by electrical current passed therethrough and is accompanied by a return current path closely spaced to the element to minimize stray magnetic fields produced by the actuating current.

Other features and advantages of the present invention will become apparent upon a perusal of the following specification taken in connection with the accompanying drawings wherein:

FIG. 1 is a fragmentary side elevational view, partly broken away and partly schematic, of a cycloidal mass spectrometer employing features of the present invention, FIG. 2 is a circuit diagram of the voltage supply for the mass analyzer of the mass spectrometer of FIG. 1, FIG. 3 is an enlarged plan view of the slit actuating mechanisms of FIG. 1 taken along either one of the lines 3—3 in the direction of the arrows, FIG. 4 is a sectional view of the structure of FIG. 3 taken along line 4—4 in the direction of the arrows, FIG. 5 is a sectional view of the structure of FIG. 3 taken along line 5—5 in the direction of the arrows, FIG. 6 is an alternative embodiment of the structure of FIG. 3 delineated by line 6—6, and FIG. 7 is a circuit diagram of the electrically adjustable slits of FIGS. 3–6.

Referring now to FIG. 1 there is shown a cycloidal mass spectrometer system. More particularly, an array of generally rectangular shaped ring electrodes 1 are insulatively supported within a thin rectangular vacuum envelope 2, only partially shown, from a heavy demountable rectangular flange portion of the envelope, not shown, which closes off one end of the vacuum envelope 2.

The separate rings 1 of the electrode array are operated at slightly different electric potentials derived from a voltage source 3 (see FIG. 2) via leads 4 connected at nodes 5 of a voltage divider network 6. The different potentials applied to the different rings 1 establishes a region of uniform electric field E in the hollow interior of the ring electrode array. The electric field E is directed parallel to the line of development of the ring electrode array.

The electrode array is immersed in a uniform region of magnetic field H directed at right angles to the direction of the electric field E. The field H is conveniently produced by an electromagnet 7 with the vacuum envelope 2 being disposed in the narrow gap defined between a pair of pole pieces 8 of the magnet 7.

The envelope 2 is evacuated in use via pump 10 to a suitably low pressure as of $10^{-8}$ torr. Gas to be analyzed by the analyzer section, including the array of electrodes 1, is introduced from a source 9 into the mass analyzer section through the vacuum envelope 2 via an inlet tubing 11 as of stainless steel. The inlet tubing 11 feeds gas at a desired rate into an ion source 12. The ion source ionizes the gas and projects it through a slit into the crossed magnetic field H and electric field E of the mass analyzer.

Under the influence of the crossed electric and magnetic fields the ions are caused to execute cycloidal trajectories. However, only ions of a certain mass number, for a given intensity of E and H, will be focused at a detector slit 13 a certain focal distance from the source and at the same electric potential. An ion detector 14 is positioned behind the slit 13 to produce an output corresponding to number of ions under analysis having the certain predetermined focused mass number, if any.

The output is fed to an amplifier 15 which amplifies the detected signal and feeds it to the Y axis of an X-Y recorder 16 wherein it is recorded as a function of a scan of the magnetic field intensity H produced by a scan generator 17. The output of the recorder 16 is a mass spectrum of the sample under analysis.

Referring now to FIGS. 3–5 there is shown the electrically adjustable ion beam defining slit mechanism 21 of the present invention. More particularly, the slit adjusting mechanism 21 is mounted transversely across one of the ring electrodes 1' and is designed to be thin in the direction of the electric field E such that it can be confined substantially entirely within the interior of the ring electrode 1', whereby the uniformity of the electric field E in the vicinity of the ion beam 20 is least perturbed. There are two such adjustable slits 13, one for the source 12 forming the beam exit slit 13 of the source 12 and one for the detector forming the beam entrance slit 13 for the detector 14. Both mechanisms 21 are substantially identical and connected in circuit to vary the slit widths alike and therefore will be described in detail as employed for the beam exit slit of the ion source 12.

The slit 13 is elongated in the direction of the magnetic field H and has a length as of 0.315" and an adjustable width as of 0.0000 to 0.005". The slit 13 has its width defined by the spacing between the ends of two plate like members 22 and 23 as of 0.060" thick and 0.315" wide stainless steel plate carried within a way 24 cut into a base plate member 25 as of stainless steel. The base plate 25 is mounted transversely across the ring electrode 1' by mounting screws 26.

One of the slit defining members 23 is fixedly held in position to the base plate 25 by a screw 27. The other slit defining member 22 is free to slide in the way 24. An actuating lever 28 as of stainless steel is pivotally pinned to the sliding member 22 via pin 29 and pivotable about a shaft 31 formed by a screw threaded into the base plate 25. The outer end of the actuating lever 28 is drilled at 32 to receive the end of a thermally expansive actuating member 33 as of 0.010" diameter stainless steel wire approximately 1" in length. The other end of the thermal member 33 is affixed to the end of a pivotable lever 34 as of stainless steel by being passed through and crimped over the drilled end of the lever 34 at 35.

The lever 34 is electrically connected to a screw 36 which passes through the base plate 25 and about which the lever 34 is pivotable. Screw 36 forms one electrical terminal for the thermally expansive member 33 and is electrically insulated from the base plate 25 via a sapphire bushing 37 mounted in the plate 25. The lever 34 is adjustable about the pivot screw 36 by means of a jack screw 38 passing through the drilled and tapped opposite end of the lever 34 at 39. The jack screws bears at its end against a raised shoulder 41 of the base plate 25 via the intermediary of an electrically insulating post 42 as of boron nitride.

The thermally actuating member 33 is spring biased by means of a cantilever spring 43 made of a refractory resilient metal such as tungsten 0.125" wide, 0.020" thick and 0.625" in length. The spring member 43 is elongated transverse to the beam 20 and is fixed to the end of the base plate 25 via a screw 44 and a pair of nuts 45. The free end of the cantilever spring member 43 is apertured and bears against a nut 46 threaded on a screw 47 passing through the apertured spring 43. The screw 47 bears at its inner end against the end of the sliding slit defining member 22. In this manner the spring bias force is transmitted to the movable slit defining member 22 and indirectly through lever 28 to the thermally expansive member 33 to put it in tension.

The sliding slit defining member 22 is captured in the way 24 by having a tapered side edge portion at 49 (see FIG. 5) bearing against a similarly and complementary tapered end portion 51 of a plate 52 affixed to the base plate 25 via screw 53.

In operation, the jack screw 38 is adjusted such that, for the cold position of the wire 33, the sliding member 22 is in a position to define the maximum adjustable slit width as, for example, 0.005". An adjustable electrical current as derived from a power supply 54 (see FIG. 7) is then passed through the thermally expansible wire 33. The current heats the wire 33 causing it to expand in its axial direction thereby permitting the spring bias to close the slit 13 by an amount as determined by the thermal expansion of the wire 33. In the case of the 0.010" diameter wire 33, a 250° C. heating of the wire over its ambient temperature permitted the slit width to be varied from a full open width of 0.005" to a fully closed width of 0.0000". The maximum heating current for the wire 33 was 3 amps and the time constant for full closed to full open was about 30 seconds.

In the cycloidal mass spectrometer both the source and detector slits 13 have their widths adjusted in concert. A convenient circuit for adjusting the slits 13 in concert is to connect the thermally expansive elements 33 in parallel with a common power supply 54 (see FIG. 7). The current from the power supply 54 is varied by a variable resistor 55 connected in series with the power supply 54. A current meter 56 measures the current to the thermal wires 33. The electrical circuit in each slit actuating mechanism 21 includes a lead 57 to the screw 36 which conducts the current to and through the thermally expansive wire 33. The electrical resistance of the wire 33 causes it to heat up and expand. The current is conducted through the wire 33 to ground via pivot screw 31, base plate 25 and ring electrode 1' which is grounded.

The resolution of the output mass spectra is directly related to the slit widths. The output resolution is measured for various current readings on the meter 56 and from the resolution obtained the slit width may be readily calculated. The current readings may then be calibrated in terms of resolution or slit width, as desired.

By making the thermal element 33 of the same material as the base plate 25 or of a material having the same coefficient of thermal expansion as the base plate, changes in ambient temperature do not produce changes in the slit width. Also a preferred embodiment of the slit adjusting mechanism 21 includes an electrostatic shield as of 0.010" thick stainless sheet covering over the mechanism flush with the top side edge of the ring electrode 1' and including a central rectangular recessed portion around the slit 13 as indicated by the phantom lines 58. The shield 58 tends to reduce non-uniformities in the electric field in the vicinity of the ion beam 20 as might otherwise be produced by the elements of the slit adjusting mechanism 21.

Referring now to FIG. 6 there is shown an alternative embodiment of the thermally expansive element which prevents setting up undesired stray magnetic fields in the vicinity of the ion beam 20. In particular, the wire 33 is formed in a hairpin or bifilar shape to provide an electrical return path for the heating current which is closely spaced to the other path such that any stray magnetic field generated by one leg of the element is cancelled by the other. In this case, the turn around loop portion 59 is insulated from the lever 28 via a drilled refractory insulator 60 as of alumina fixedly carried at the end 32 of the lever 28. A similar insulating bushing 61 insulates the return leg 33' at the end 35 of the other lever 34. The end 62 of the return leg 33' includes a loop 63 to accommodate movement of the lever 34 and is electrically connected to the shoulder 41 of the base plate 25 and thus connected to ground at that point.

The thermally expansive members 33 are elongated in a plane transverse to the direction of the ion beam 20 such that the length components of members as projected onto the transverse plane represent at least a preponderance of the length of the members and preferably substantially the entire length of the members. In this manner the actuating mechanism 21 may be confined to a region of space which is thin, i.e., approximately 0.125" thick in the direction of the ion beam 20 to prevent unwanted perturbation of the electric field E of the mass analyzer portion of the spectrometer.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a mass spectrometer, means forming an array of closely spaced axially aligned elongated and relatively thin ring-shaped electrodes electrically insulatively supported relative to each other and adapted to be energized with a series of independent electrical potentials to establish a uniform electric field within the interior region of said array of electrodes, the uniform electric field being directed at right angles to a uniform magnetic field to be applied within the region of uniform electric field for analyzing the ions according to their charge-to-mass ratio, means for providing a source of ions and for forming the ions into a beam and projecting the beam into the region of uniform crossed electric and magnetic fields to cause the ions to execute cycloidal trajectories and to be focused at a certain focal distance according to their charge-to-mass ratios, means forming an ion detector disposed at a certain focal distance for collecting ions focused at that focal distance, means disposed in alignment with the beam path at the output of said ion source for adjusting the thickness of the beam and having an adjustable beam thickness defining slit, the improvement wherein, said adjustable beam defining slit means includes a pair of plates disposed within and lying in the plane of one of said elongated ring-shaped electrodes, said plates having a pair of mutually opposed spaced apart parallel side edges to form the beam defining slit therebetween, a thermally expandable wire mechanically coupled to at least one of said beam defining plates for moving at least one of said plates relative to the other in response to an electrical current passed through said wire, whereby the slit width and thus the beam width is electrically adjustable, means forming an elongated cantilever spring means mechanically coupled to at least one of said beam defining plates to provide a spring bias force acting against said thermally responsive wire to put said wire in tension, and said thermally responsive wire and said cantilever spring and said pair of beam defining plates all being substantially entirely contained within one of said ring electrodes, whereby the beam defining slit means and its actuating structure are confined to a thin region of space within one of said ring electrodes to minimize perturbation of the uniform electric field in the analyzer.

2. The apparatus according to claim 1 including a second wire portion closely spaced to and connected in series with said first thermally responsive wire for passing equal current in the opposite direction adjacent said thermally responsive wire to reduce stray magnetic fields in the vicinity of the slit.

References Cited

UNITED STATES PATENTS 2,852,684 9/1958 Payne.
2,977,470 3/1961 Robinson _____ 250—41.9

RALPH G. NILSON, *Primary Examiner.*

S. C. SHEAR, *Assistant Examiner.*